Patented Mar. 30, 1948

2,438,694

UNITED STATES PATENT OFFICE 2,438,694

MANUFACTURE OF PHENOLS

Charles Arthur Cross, Northwich, England, assignor to Imperial Chemical Industries Limited, a corporation of Great Britain No Drawing. Application December 11, 1945, Serial No. 634,389. In Great Britain December 22, 1944

5 Claims. (Cl. 260—619)

This invention relates to the manufacture of phenols from non-tertiary amines by a vapour phase process.

It is known that amines can be hydrolysed by an equilibrium reaction in the liquid phase with water under pressure in the presence of phosphoric and other acid catalysts to liberate ammonia and produce phenols. It is also known that phenol and naphthol can be reacted with a large excess of ammonia in the vapour phase by passage over an alumina catalyst at a high temperature to give substantial conversion to aniline and naphthylamine respectively. The object of the present invention is to convert aromatic amines into phenols by a vapour phase reaction at atmospheric pressure, by a process which can be operated easily and continuously and which is substantially free from corrosion difficulties.

According to the present invention, we manufacture phenols by passing a vapour containing a volatile aromatic non-tertiary amine and a molecular excess of steam over alumina catalyst at a temperature exceeding 350° C., preferably 400°–550° C., and at substantially atmospheric pressure, and thereafter separating the phenol from the mixture produced.

Typical amines which we may use are aniline, diphenylamine, monoethylaniline, α-naphthylamine and m-toluidine. Of these, α-naphthylamine and m-toluidine are preferred because good yields of industrially valuable material are obtained. In general, the amines used have a molecular weight not exceeding 300, and they include volatile derivatives of amines such as chloraniline. Only the primary and secondary amines yield useful amounts of phenols by the vapour phase reaction of the present invention.

The proportion of steam and the space velocity govern the conversion of the amine and also the output of the phenol. At a given total space velocity a high proportion of steam increases the per cent conversion of amine but decreases the output per unit volume of reaction space because of the smaller input of amine. For a given proportion of steam, high space velocities decrease the per cent conversion of the amine, but nevertheless increase the output of phenol per hour. A high proportion of steam is preferably associated with a high total space velocity, as otherwise the output of phenol suffers due to the small input of amine. We prefer to use at least 5 moles of steam per mole of amine because smaller proportions than this only give a low per cent conversion of the amine to phenol. At the same time, it is inefficient to use more than 50 moles of steam per mole of amine because this steam consumption is unnecessarily high. We therefore prefer to use between 5 and 50 moles of steam per mole of amine. We also prefer to pass the vapours through the reaction zone at a space velocity of between 50 and 5000 volumes per hour per volume of reaction space, measured at the operating temperature and atmospheric pressure. The yield of phenol from the amine is also dependent on restricting the loss of material as by-products such as diphenylamine and tar. The quantity of such by-products is increased with increase in the contact time, so we prefer to keep the space velocity above 50 volumes per hour per volume of reaction space. Thus our preferred conditions range from the use of 5 moles of steam per mole of amine and a space velocity of 50 vols. per hour, to 50 moles of steam per mole of amine and a space velocity of 5000 vols. per hour.

As alumina catalyst we use a material obtained by heating clay or aluminium hydroxide to activation temperature. We prefer to use gamma alumina prepared by heating boehmite (AlO(OH)) at 300°–400° C. for several hours; the boehmite for this purpose may be made by precipitation from aluminium salts or from sodium aluminate, washing the precipitate to remove impurities, and subsequently heating it. It is convenient to have the alumina in the form of granules or pellets of about $\frac{1}{16}''$–$\frac{1}{2}''$ in size. The manufacture of one suitable catalyst is described in British specification 554,889.

The temperature required depends principally upon the amine used. A low temperature, such as 350° C., gives a low rate of reaction, but a high temperature, such as 580° C., causes loss of amine and loss of catalytic activity by carbon deposition, especially with the higher molecular weight amines. For this reason, the maximum temperature of the vapour is generally kept below 600° C. Loss of catalyst activity usually occurs during 20–100 hours' working, and the catalyst can be revived by known methods. Such methods include passing steam or an inert gas, mixed with a restricted amount of air, over spent catalyst maintained at 350°–600° C. Steam is preferred because it not only removes the heat liberated during this revival but also assists the removal of adhering organic matter and reacts with the carbon present. In addition, water can be injected as a means of controlling the burning off temperature. In another method of burning off, the catalyst may be removed from the reaction vessel, mixed with revived catalyst and then burnt off; the purpose of the revived catalyst being to absorb the heat liberated.

The reaction is generally carried out in a heated mild steel vessel. Alternatively the mixture may be preheated and passed into a vessel containing catalyst and maintained at the reaction temperature. The product may be separated from the issuing vapour by condensing the vapour, separating the aqueous layer from the condensate and recovering the phenol from the phenol-amine layer by known methods. In the case of aniline and phenol a suitable method is to extract the phenol with caustic soda, distill off the aniline dissolved in the alkaline extract and thereafter liberate the phenol with acid. Other amines and phenols can be separated by fractional distillation. In the case of aniline, approximately 10% of it can be converted into phenol per pass; recovered aniline, diphenylamine and other by-products, can be removed or returned with fresh material to the same process again. The example is illustrated but not restricted by the following example.

*Example*

Equal parts by weight of α-naphthylamine and water are vaporised and heated to 460° C. at 1 atmosphere absolute pressure. The superheated mixed vapour is passed at the rate of 150 gm./hour/litre, equivalent to 280 volumes per hour per volume of reaction space (measured at 460° C. and atmospheric pressure), over a gamma alumina catalyst in the form of 4–8 mesh granules packed in a reaction tube and kept at 460° C. The average conversion to naphthol is 30%, and the mean output is 22.5 gm. of naphthol/hour/litre of catalyst space. The naphthol is separated from the amines by fractional distillation, and the unchanged amine, containing some dinaphthylamine, is returned with more steam and fresh amine to the reaction tube.

What I claim is:
1. Process for the manufacture of phenols which comprises passing a vapour containing a volatile aromatic non-tertiary amine and a molecular excess of steam, the range being between 5 and 50 moles of steam per mole of amine, over alumina catalyst at a temperature exceeding 350° C., preferably 400°–550° C., and at substantially atmospheric pressure, and thereafter separating the phenol from the mixture produced.
2. Process as claimed in claim 1 in which the vapours pass through the reaction zone at a space velocity of between 50 and 5000 volumes per hour per unit volume of the reaction space, measured at the operating temperature and atmospheric pressure.
3. Process as claimed in claim 1 in which the catalyst is gamma alumina pellets prepared by heating boehmite at 300°–400° C.
4. Process as claimed in claim 1 in which the amine used is α-naphthylamine.
5. Process which comprises passing a mixture of equal parts by weight of α-naphthylamine and steam at 460° C. and atmospheric pressure, at a combined rate of 150 gms./hour/litre of reaction space, over granular gamma alumina catalyst and separating α-naphthol from the issuing vapour by fractional distillation.

CHARLES ARTHUR CROSS.

REFERENCES CITED

The following references are of record in the file of this patent:

UNITED STATES PATENTS

| Number | Name | Date |
| --- | --- | --- |
| 1,910,679 | Crawford | May 23, 1933 |
| 2,273,030 | Fitzki | Feb. 17, 1942 |
| 2,289,001 | Fitzki | July 7, 1942 |
| 2,292,561 | Eversole | Aug. 11, 1942 |